United States Patent
Shinosaki

(10) Patent No.: US 10,681,229 B2
(45) Date of Patent: Jun. 9, 2020

(54) IMAGE PROCESSING APPARATUS FOR CONTROLLING DISPLAY OF A CONDITION WHEN THE DISPLAYED CONDITION IS OBSCURED BY A HAND OF A USER AND METHOD AND NON-TRANSITORY RECORDING MEDIUM STORING COMPUTER READABLE PROGRAM

(71) Applicant: KONICA MINOLTA, INC., Chiyoda-ku, Tokyo (JP)

(72) Inventor: Yusuke Shinosaki, Amagasaki (JP)

(73) Assignee: KONICA MINOLTA, INC., Tokyo (JP)

( * ) Notice: Subject to any disclaimer, the term of this patent is extended or adjusted under 35 U.S.C. 154(b) by 4 days.

(21) Appl. No.: 15/872,080

(22) Filed: Jan. 16, 2018

(65) Prior Publication Data

US 2018/0220018 A1    Aug. 2, 2018

(30) Foreign Application Priority Data

Feb. 2, 2017  (JP) ................................ 2017-017338

(51) Int. Cl.
*H04N 1/00* (2006.01)

(52) U.S. Cl.
CPC ..... *H04N 1/00437* (2013.01); *H04N 1/00411* (2013.01); *H04N 1/00419* (2013.01); *H04N 1/00474* (2013.01); *H04N 1/00506* (2013.01); *H04N 2201/0094* (2013.01)

(58) Field of Classification Search
CPC .................. H04N 1/00506; H04N 1/00501
See application file for complete search history.

(56) References Cited

U.S. PATENT DOCUMENTS

| 9,189,140 | B2 | 11/2015 | Yoshida | |
|---|---|---|---|---|
| 2010/0085303 | A1* | 4/2010 | Kwok | G06F 3/0414 345/157 |
| 2012/0032979 | A1* | 2/2012 | Blow | G06F 1/1626 345/647 |
| 2012/0182296 | A1* | 7/2012 | Han | G06F 3/04883 345/419 |
| 2014/0121524 | A1* | 5/2014 | Chiang | G16H 30/20 600/459 |

(Continued)

FOREIGN PATENT DOCUMENTS

| JP | 2013093043 A | 5/2013 |
|---|---|---|
| JP | 2013164677 A | 8/2013 |

*Primary Examiner* — Benjamin O Dulaney
(74) *Attorney, Agent, or Firm* — Holtz, Holtz & Volek PC

(57) ABSTRACT

An image processing apparatus includes a touch-sensitive panel display; and a hardware processor. The hardware processor is configured to presume a hidden region when a user finishes performing a gesture on the touch-sensitive panel display, the hidden region being a part of the touch-sensitive panel display and covered at least by a hand of the user to prevent the user from seeing, and determine a condition corresponding to the gesture. The touch-sensitive panel display is configured to display the condition, and where a requirement that the hidden region and a display region in which to display the condition overlap each other is satisfied, the touch-sensitive panel display displays the condition again before processing is performed in accordance with the condition.

15 Claims, 15 Drawing Sheets

(56) References Cited

U.S. PATENT DOCUMENTS

| | | | |
|---|---|---|---|
| 2014/0368442 A1* | 12/2014 | Vahtola | G06F 3/013 345/173 |
| 2015/0026176 A1* | 1/2015 | Bullock | G06F 16/93 707/736 |
| 2015/0130728 A1* | 5/2015 | Takenaka | G06F 3/041 345/173 |
| 2015/0268802 A1* | 9/2015 | Kim | G06F 3/04842 715/763 |
| 2017/0336966 A1* | 11/2017 | Morton | G06F 3/04812 |
| 2018/0091667 A1* | 3/2018 | Yamasaki | H04N 1/00472 |

* cited by examiner

IMAGE PROCESSING APPARATUS FOR CONTROLLING DISPLAY OF A CONDITION WHEN THE DISPLAYED CONDITION IS OBSCURED BY A HAND OF A USER AND METHOD AND NON-TRANSITORY RECORDING MEDIUM STORING COMPUTER READABLE PROGRAM

The entire disclosure of Japanese Patent application No. 2017-017338, filed on Feb. 2, 2017, is incorporated herein by reference in its entirety.

BACKGROUND

1. Technological Field

The present invention relates to a technology for displaying information in a touch-sensitive panel display of an image processing apparatus.

2. Description of the Related Art

Image forming apparatuses called multifunctional devices or Multi Function Peripherals (MFPs) have attained widespread use. Such an image forming apparatus is usually provided with a touch-sensitive panel display. The image forming apparatus displays, in the touch-sensitive panel display, a screen on which to set conditions for a job and receives the conditions through a gesture made by a user with his/her finger.

To be specific, the image forming apparatus displays a screen on which to set conditions for a job. The image forming apparatus then detects a gesture of "10" drawn by a user's finger, and a gesture of "C" drawn by the user's finger. The image forming apparatus thereby receives the condition that the number of prints is "10 sets" and the condition that a paper input tray to be used is a "manual" tray. The image forming apparatus then displays the screen again with the conditions reflected.

In the touch-sensitive panel display of this type, the finger sometimes touches on a part of the display where information is shown, which reduces the user visibility. The following technologies have been proposed to solve such a problem.

According to one of the technologies, an image processing apparatus includes a first display part for displaying a first image in a prescribed display region of a display device; a position detection part for detecting a position designated in the display region; and a second display part for duplicating a second image in a prescribed range including the position detected by the position detection part from the first image, and for displaying the second image at a prescribed position away from the detected position on the first image (Japanese Laid-open Patent Publication No. 2013-93043).

According to the other technology, an image processing apparatus displays items in a list, performs slide display of the items displayed in the list in response to instructions operation by a user, and when it is determined that there is a change in an item to be displayed in the list, the user is notified that there is a change in the items displayed in the list by, for example, stopping the slide display or performing highlighted display (Japanese Laid-open Patent Publication No. 2013-164677).

In the meantime, in order to ensure that a job is executed as instructed by a user, before the job execution, it is desirable to display conditions given by the user in a screen different from the screens of FIGS. 7 and 8 to prompt the user to check the conditions. However, a problem arises in which, if all of the conditions are displayed, the user checks the conditions roughly. The image processing apparatuses disclosed in Japanese Laid-open Patent Publication Nos. 2013-93043 and 2013-164677 are not capable of solving the problem.

SUMMARY

The present invention has been achieved in light of such a problem, and therefore, an object of an embodiment of the present invention is to allow a user to check conditions set by him/her more efficiently than is conventionally possible.

To achieve at least one of the abovementioned objects, according to an aspect of the present invention, an image processing apparatus reflecting one aspect of the present invention is an image processing apparatus including a touch-sensitive panel display; and a hardware processor; wherein the hardware processor is configured to presume a hidden region when a user finishes performing a gesture on the touch-sensitive panel display, the hidden region being a part of the touch-sensitive panel display and covered at least by a hand of the user to prevent the user from seeing, and determine a condition corresponding to the gesture, and the touch-sensitive panel display is configured to display the condition, and where a requirement that the hidden region and a display region in which to display the condition overlap each other is satisfied, the touch-sensitive panel display displays the condition again before processing is performed in accordance with the condition.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention.

DETAILED DESCRIPTION OF THE EMBODIMENTS

Hereinafter, one or more embodiments of the present invention will be described with reference to the drawings. However, the scope of the invention is not limited to the disclosed embodiments.

First Embodiment

Figure 1:
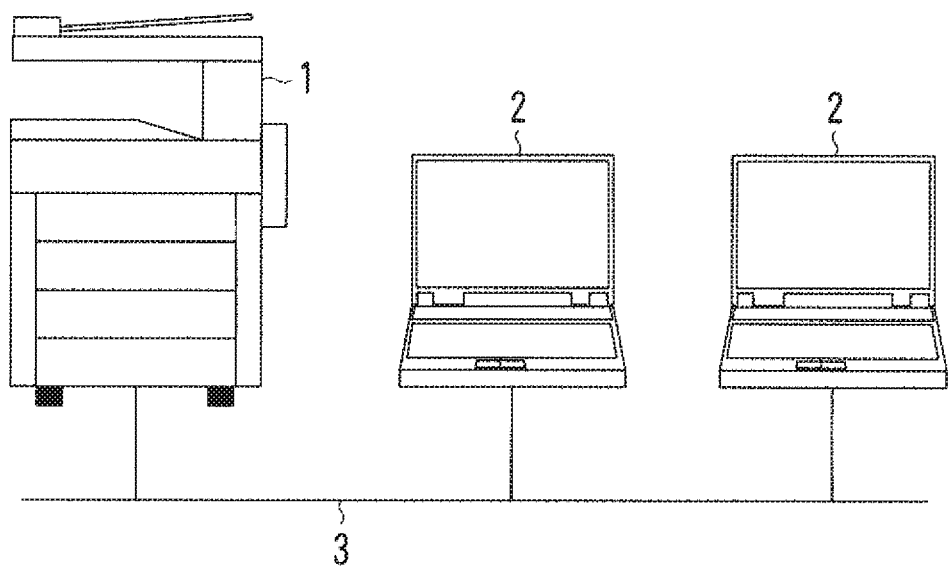
FIG. 1 is a diagram showing an example of the overall configuration of a network system including an image forming apparatus.
Figure 2:
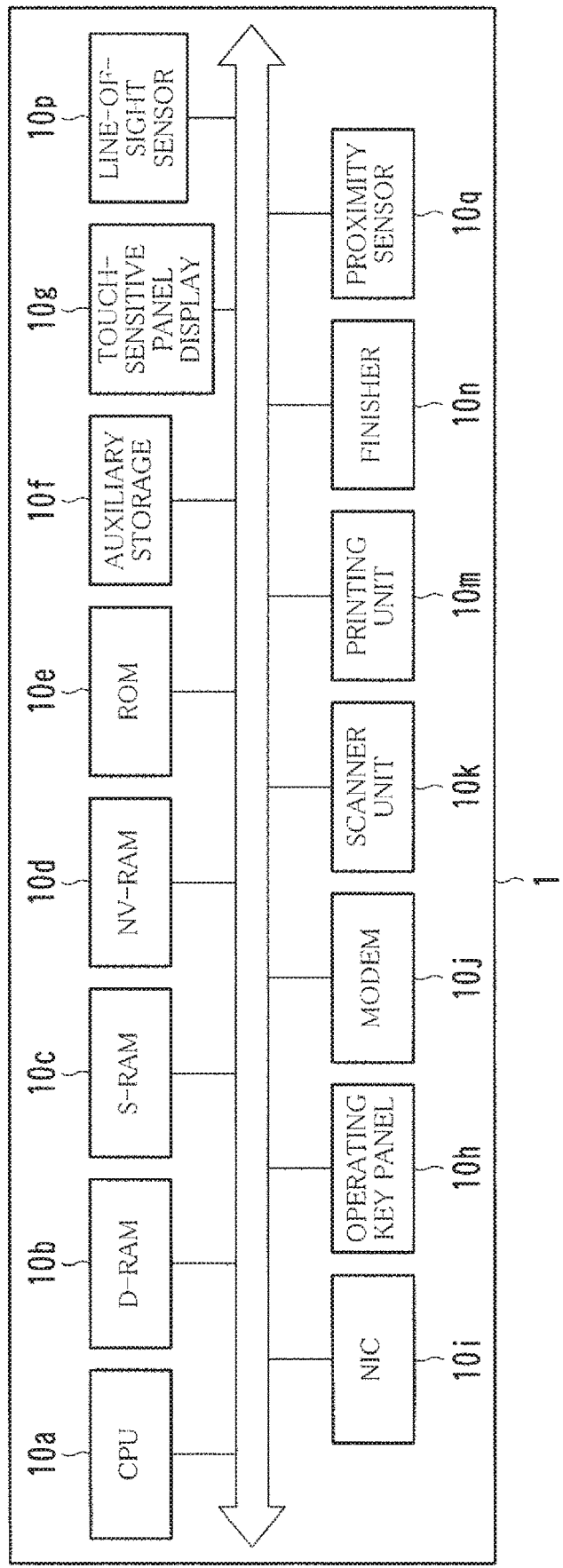
FIG. 2 is a diagram showing an example of the hardware configuration of an image forming apparatus.

FIG. 1 is a diagram showing an example of the overall configuration of a network system including an image forming apparatus 1. FIG. 2 is a diagram showing an example of the hardware configuration of the image forming apparatus 1.

The image forming apparatus 1 shown in FIG. 1 is an image processing apparatus generally called a "multifunction device", a "Multi-Functional Peripheral (MFP)", or the like. The image forming apparatus 1 is an apparatus into which functions such as copying, PC printing, faxing, scanning, and a box function are integrated.

The PC printing function is to print an image onto paper based on image data received from a terminal 2 described later.

According to the box function, each user is given a storage area called a "box" or a "personal box". The box function enables each user to save image data and so on to his/her storage area and to manage the image data and so on therein. The box corresponds to a "folder" or a "directory" in a personal computer.

The image forming apparatus 1 is configured to perform communication with a device such as the terminal 2 via a communication line 3. Examples of the communication line 3 are the Internet, a Local Area Network (LAN), and a public line. Examples of the terminal 2 are a personal computer, a tablet computer, and a smartphone.

Referring to FIG. 2, the image forming apparatus 1 is configured of a Central Processing Unit (CPU) 10a, a Dynamic Random Access Memory (D-RAM) 10b, a Static Random Access Memory (S-RAM) 10c, a Nonvolatile Random Access Memory (NV-RAM) 10d, a Read Only Memory (ROM) 10e, an auxiliary storage 10f, a touch-sensitive panel display 10g, an operating key panel 10h, a Network Interface Card (NIC) 10i, a modem 10j, a scanner unit 10k, a printing unit 10m, a finisher 10n, a line-of-sight sensor 10p, a proximity sensor 10q, and so on.

The touch-sensitive panel display 10g displays, for example, a screen for presenting messages to the user, a screen for allowing the user to enter commands or information, or a screen for showing the results of processing executed by the CPU 10a, and so on. The touch-sensitive panel display 10g also sends a signal indicating a touched location to the CPU 10a.

The operating key panel 10h is a so-called hardware keyboard. The operating key panel 10h is provided with numeric keys, a start key, a stop key, and function keys.

The NIC 10i performs communication with the terminal 2 and so on in accordance with a protocol such as Transmission Control Protocol/Internet Protocol (TCP/IP).

The modem 10j sends/receives image data with a facsimile terminal via the public line in accordance with a protocol such as G3.

The scanner unit 10k optically reads an image recorded on a sheet placed on a platen glass to generate image data thereof.

The printing unit 10m prints, onto paper, the image captured by the scanner unit 10k and an image shown in image data sent by other devices.

The finisher 10n applies a post-process, if necessary, to a printed matter obtained by the printing unit 10m. The post-process includes stapling the printed matter, punching a hole in the printed matter, and folding the printed matter.

The line-of-sight sensor 10p is to detect the direction of the line of sight of user's eyes. The line-of-sight sensor 10p is provided in a predetermined position of the touch-sensitive panel display 10g. The line-of-sight sensor 10p determines, based on the direction detected and the positional relationship between the line-of-sight sensor 10p and the touch-sensitive panel display 10g, which part of a display surface of the touch-sensitive panel display 10g the user looks at. The determination processing may be performed by the CPU 10a.

The line-of-sight sensor 10p may be an external line-of-sight sensor. In such a case, it is preferable that the image forming apparatus 1 is provided with a wireless communication device and the CPU 10a and the line-of-sight sensor 10p perform wireless communication with each other via the wireless communication device. The line-of-sight sensor 10p is, for example, a screen-based eye tracker such as "Tobii Pro X3-120" provided by Tobii Technology Inc.

The proximity sensor 10q detects whether or not an object is present within a certain distance (1 centimeter, for example) from the surface of the touch-sensitive panel display 10g. The proximity sensor 10q is, for example, an infrared sensor.

The NV-RAM 10d, the ROM 10e, or the auxiliary storage 10f stores, therein, programs for implementing the copy function or so. The programs include a copy job program 100. The copy job program 100 is to execute a job of reading out an image recorded in a document sheet to print (duplicate) the image onto another paper sheet. The job is hereinafter referred to as a "copy job".

The programs are loaded into the D-RAM 10b and executed by the CPU 10a. Examples of the auxiliary storage 10f include a hard disk drive and a Solid State Drive (SSD).

The S-RAM 10c is used as a cache memory for the case where the CPU 10a executes a program.

The copy job program 100 enables the user to enter conditions for the copy job through a gesture made by him/her.

The "gesture" herein is an action made by touching, with finger(s), a touch face (display surface) of the touch-sensitive panel display 10g and moving the finger(s) appropriately. The touch gestures include tap, double-tap, flick, pinch-in, pinch-out, and hold (hold-down).

Further, an action of writing, with finger(s), a letter or figure on the touch face also corresponds to the touch gesture. The touch action is hereinafter referred to as a "handwriting gesture".

The copy job program 100 prompts the user to check conditions specified by him/her in the touch-sensitive panel display 10g more efficiently than is conventionally possible. The mechanism thereof is described below.

Figure 3:
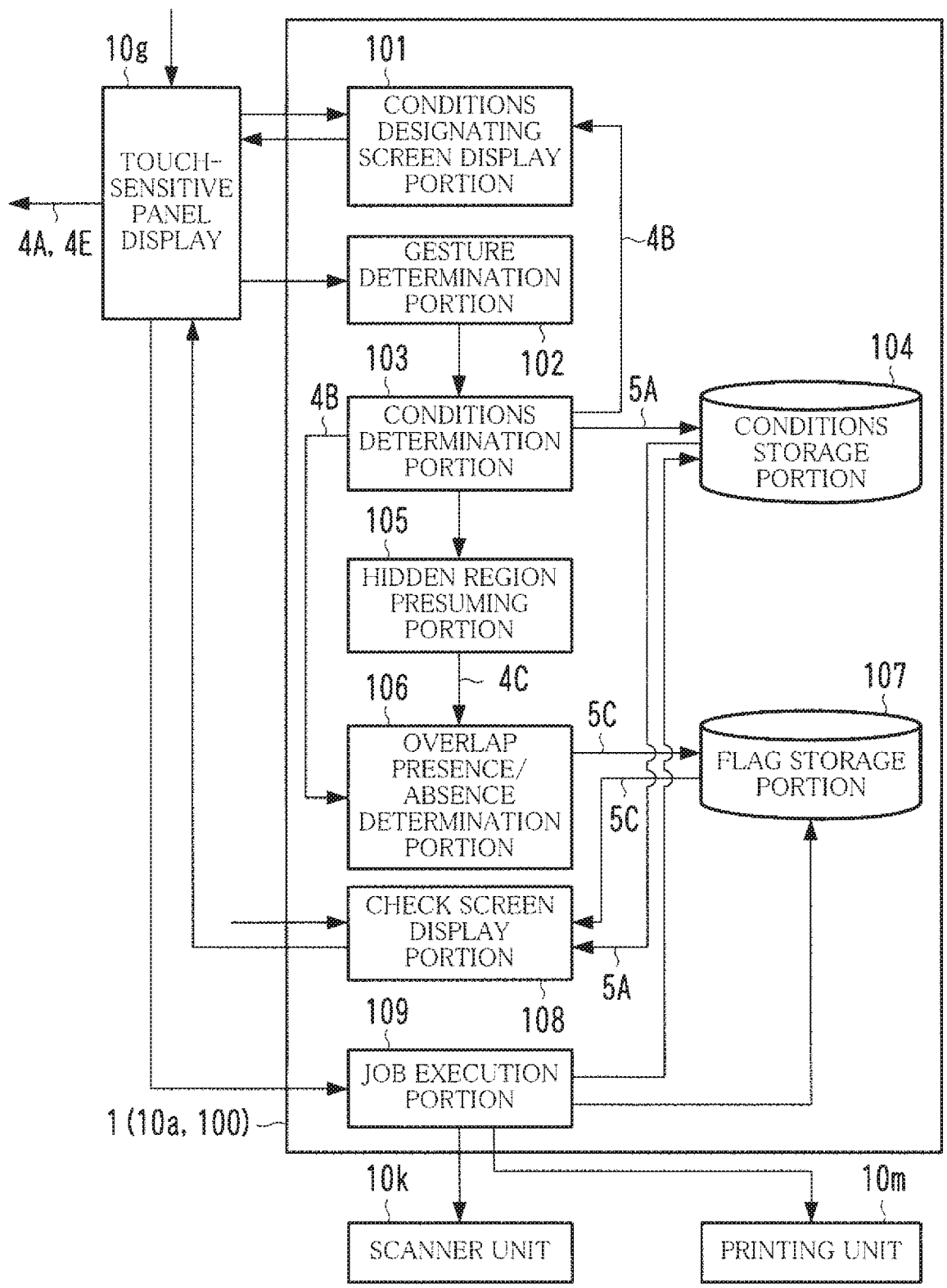
FIG. 3 is a diagram showing an example of the functional configuration of an image forming apparatus.
Figure 4:
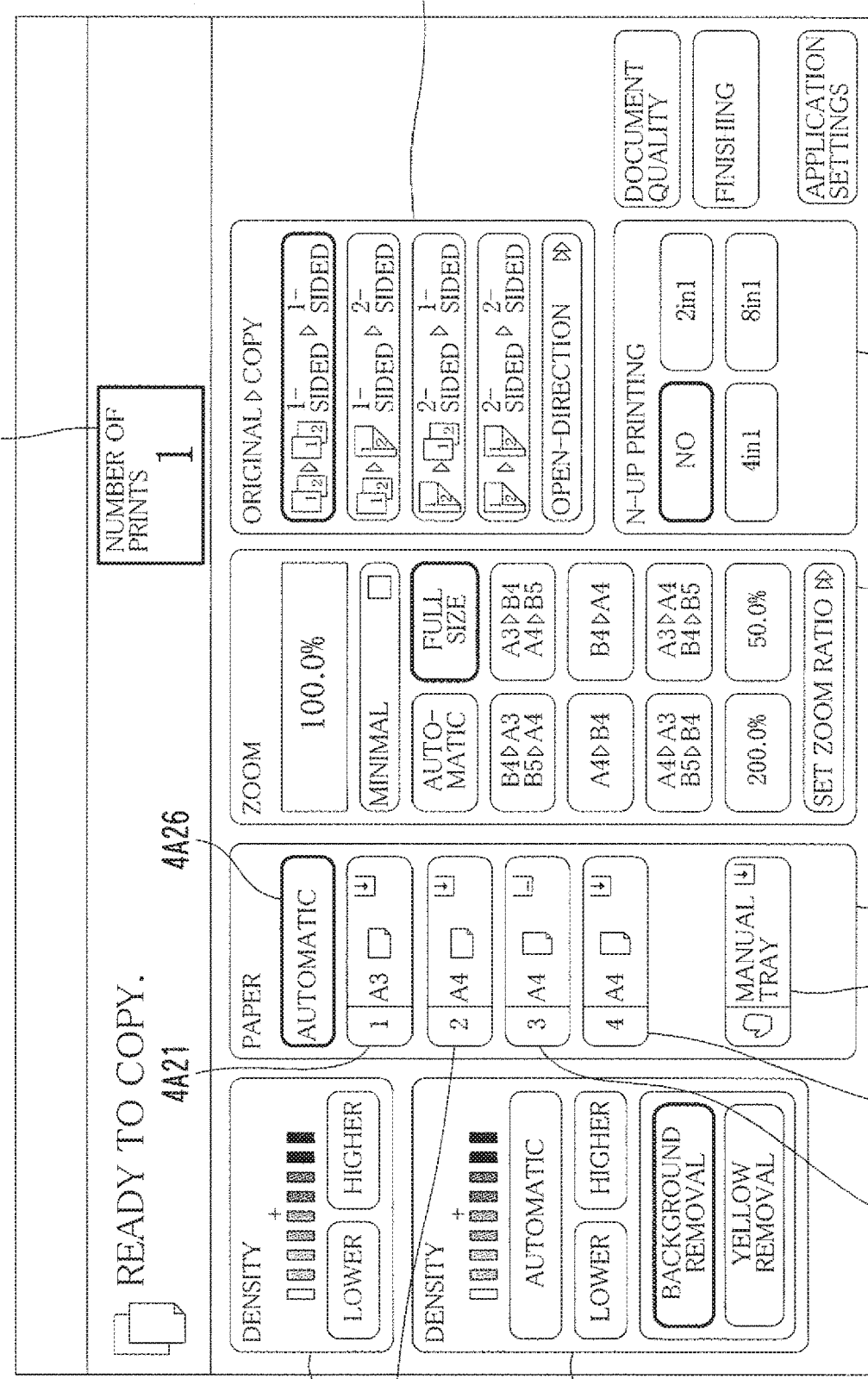
FIG. 4 is a diagram showing an example of a conditions designating screen.
Figure 5:
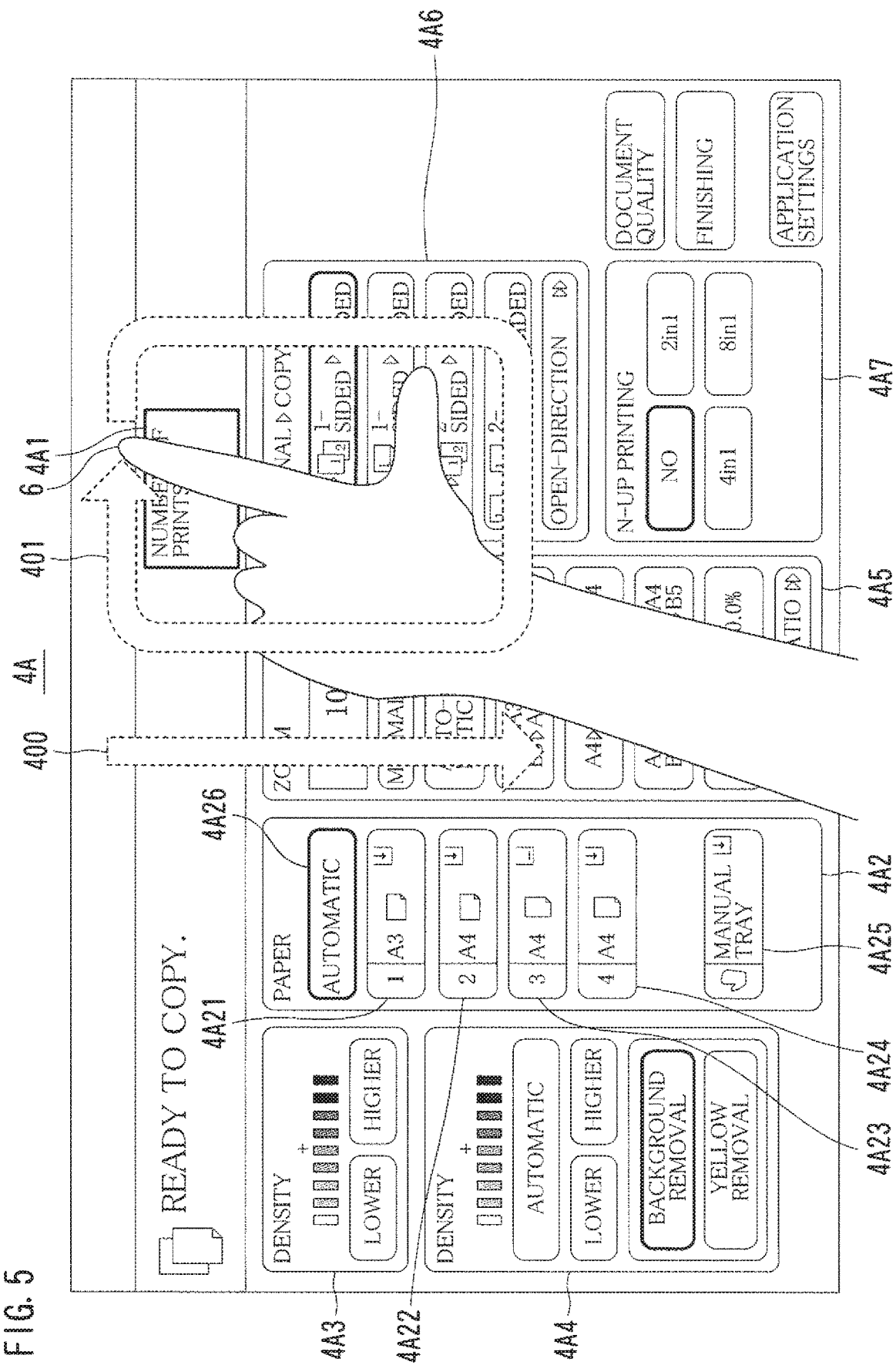
FIG. 5 is a diagram showing a first example of a handwriting gesture.
Figure 6:
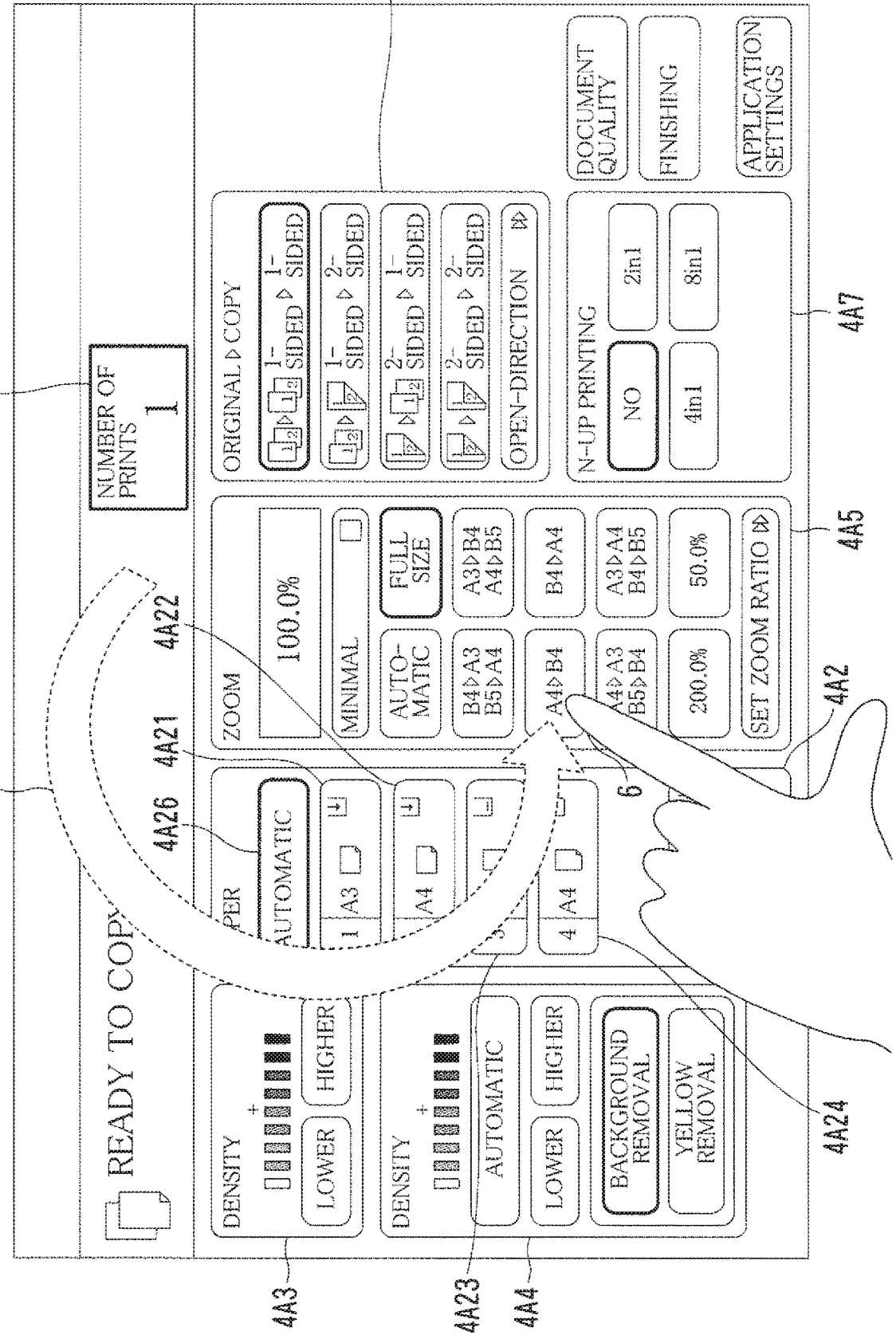
FIG. 6 is a diagram showing a second example of a handwriting gesture.
Figure 7:
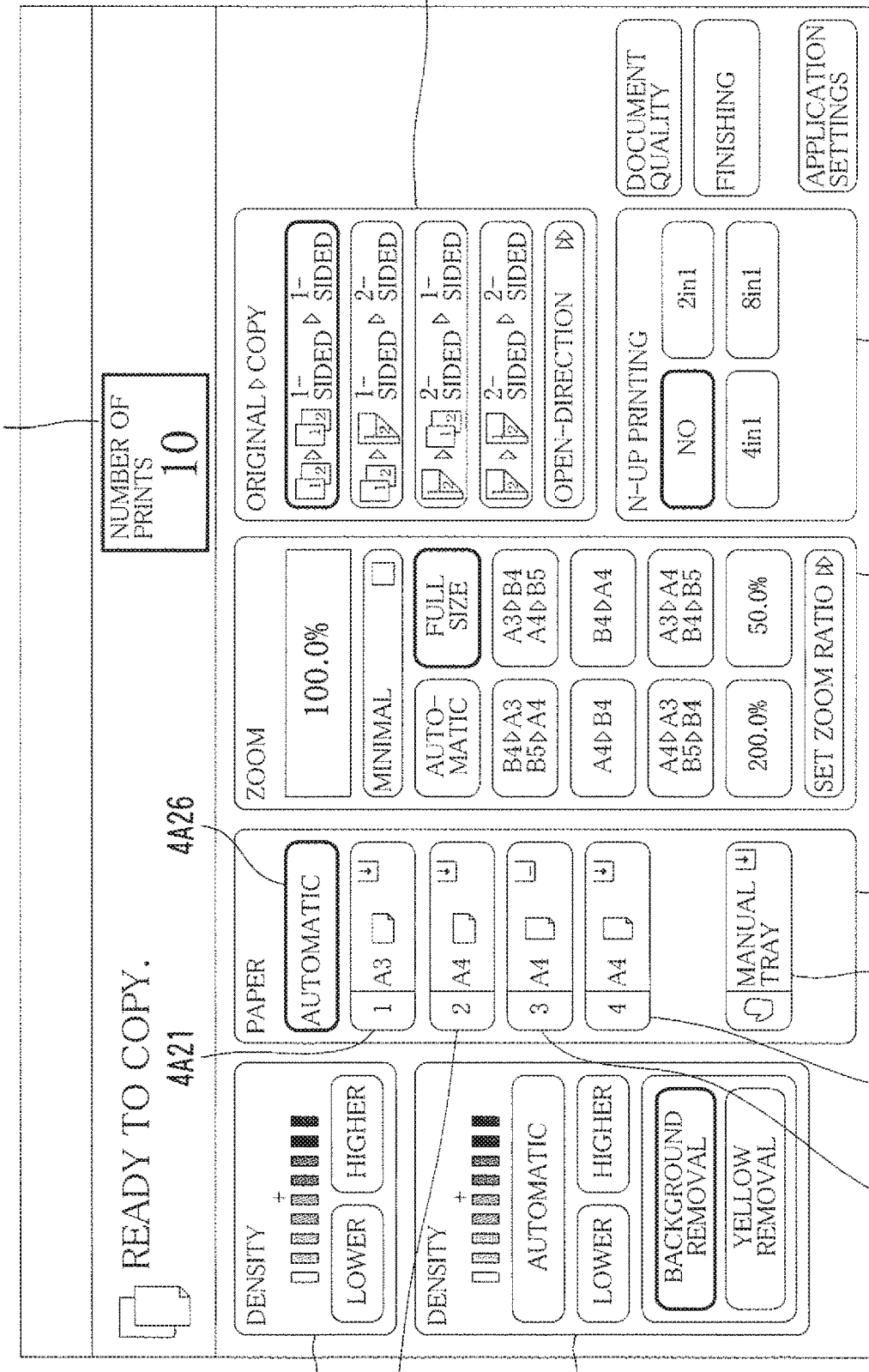
FIG. 7 is a diagram showing a first example of a state after transition of a conditions designating screen.
Figure 8:
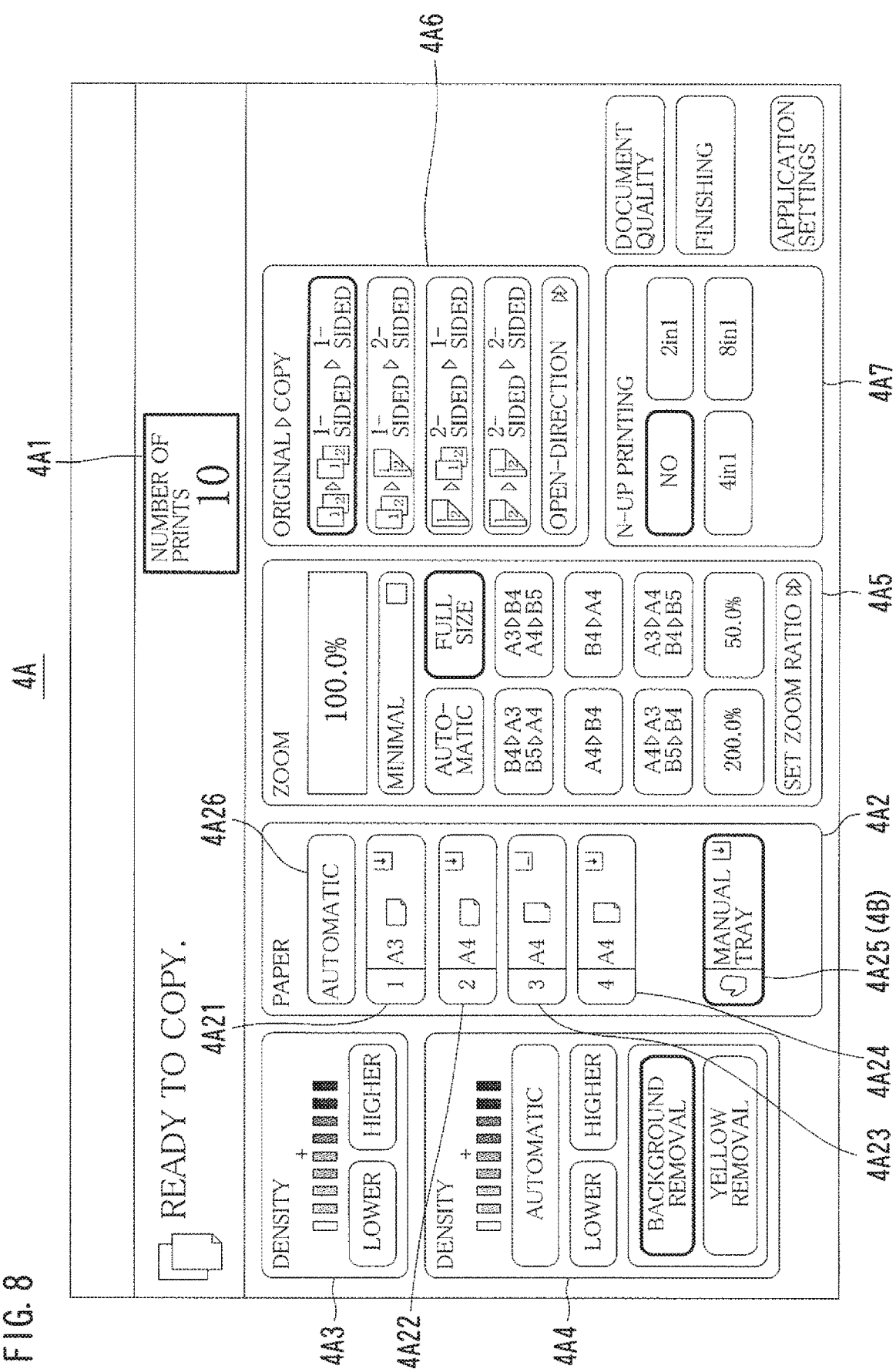
FIG. 8 is a diagram showing a second example of a state after transition of a conditions designating screen.
Figure 9A:
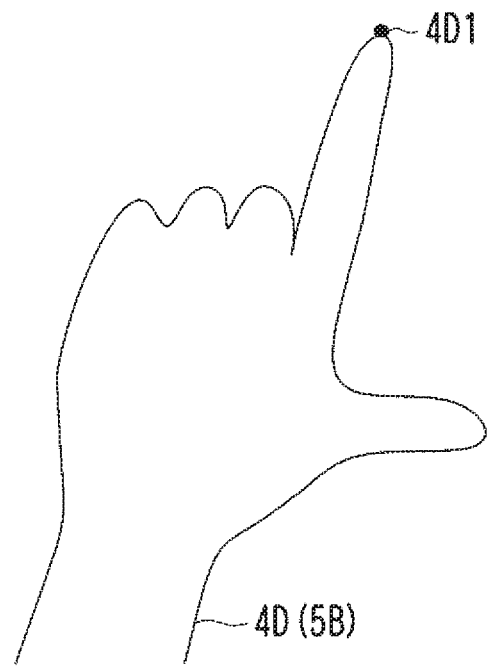
FIGS. 9(A) and 9(B) are diagrams showing an example of a hidden region and a determination method thereof.
Figure 9B:
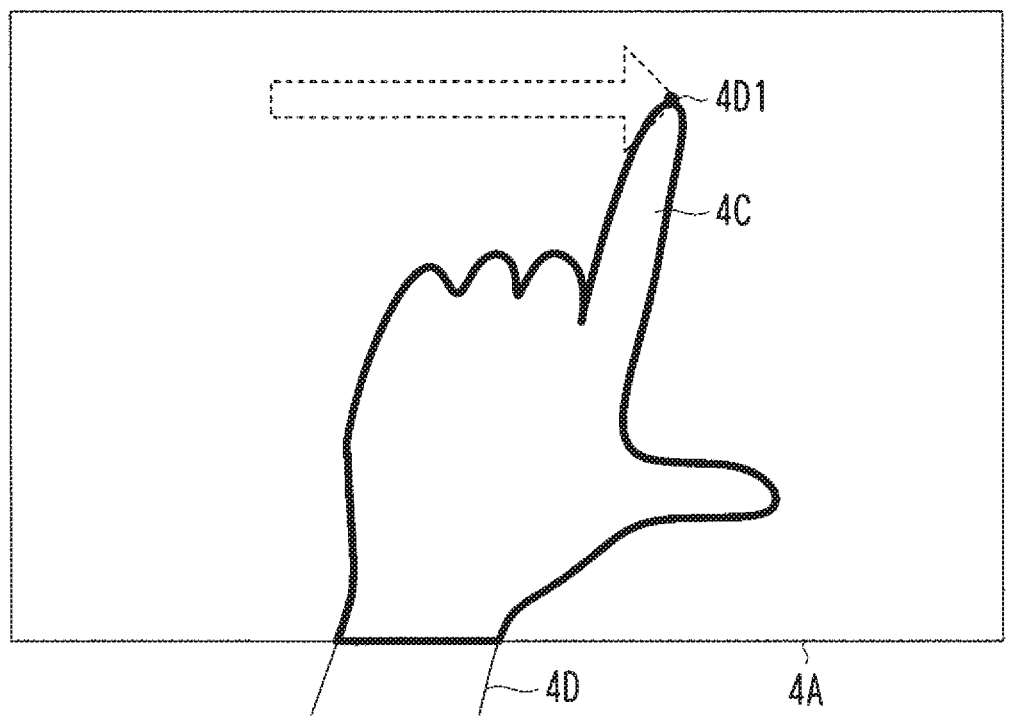

FIG. 3 is a diagram showing an example of the functional configuration of the image forming apparatus 1. FIG. 4 is a diagram showing an example of a conditions designating screen 4A. FIG. 5 is a diagram showing a first example of the handwriting gesture. FIG. 6 is a diagram showing a second example of the handwriting gesture. FIG. 7 is a diagram showing a first example of a state after transition of the conditions designating screen 4A. FIG. 8 is a diagram showing a second example of a state after transition of the conditions designating screen 4A. FIGS. 9(A) and 9(B) are diagrams showing an example of a hidden region 4C and a determination method thereof. FIG. is a diagram showing an example of a conditions check screen 4E.

The copy job program 100 implements, in the image forming apparatus 1, the functions of a conditions designating screen display portion 101, a gesture determination portion 102, a conditions determination portion 103, a conditions storage portion 104, a hidden region presuming portion 105, an overlap presence/absence determination portion 106, a flag storage portion 107, a check screen display portion 108, a job execution portion 109, and so on, all of which are shown in FIG. 3.

In response to entry of a predetermined command, or, in response to start of the copy job program 100, the conditions designating screen display portion 101 displays the conditions designating screen 4A in the touch-sensitive panel display 10g as shown in FIG. 4. The conditions designating screen 4A is a screen for the user to specify conditions for the copy job.

In the conditions designating screen 4A, a print number region 4A1 indicates how many copies to be made of an image captured from the document sheet. In short, the print number region 4A1 indicates so-called the number of prints.

The number of prints is "1" as default settings. Thus, the print number region 4A1 indicates "1".

The user operates the numeric keys of the operating key panel 10h as per the conventional art to specify the number of prints. Instead of operating the numeric keys, the user may specify the number of prints by performing a gesture as described later.

The sheet region 4A2 indicates candidates for the supply source of sheets onto which the image is to be printed (copied). To be specific, the sheet region 4A2 contains select buttons 4A21-4A26. The select buttons 4A21-4A24 correspond to the first through fourth paper feed trays from the top of the printing unit 10m, respectively. The select button 4A25 corresponds to a manual paper feed tray of the printing unit 10m. The select button 4A26 is to allow the image forming apparatus 1 to automatically select a paper feed tray from which a paper sheet is to be supplied depending on the size of a document sheet or the like.

In the sheet region 4A2, a button corresponding to a supply source currently selected (specified) from among the candidates is shown in a form different from those of the other buttons.

The default settings are so made that the image forming apparatus 1 automatically selects one of the paper feed trays. Thus, the sheet region 4A2 is so displayed that the select button 4A26 is selected (with yellow background, for example) and the select buttons 4A21-4A25 are not selected (with white background, for example).

As per the conventional art, the user can select a paper feed tray used as the supply source by tapping on one of the select button 4A21-4A26 corresponding to the paper feed tray. As discussed later, the user also can select the paper feed tray by performing a gesture of writing a letter.

In this way, both the print number region 4A1 and the sheet region 4A2 are used for the user to specify or check conditions for the copy job.

As such regions related to other items, the conditions designating screen 4A further has: a region in which to specify or check a print density (density region 4A3); a region in which to specify or check conditions for correcting a background (background region 4A4); a region in which to specify or check a magnification of an image (zoom region 4A5); a region in which to specify or check a face of a document sheet to be read and a print side of a sheet onto which printing is to be performed (surface region 4A6); a region in which to specify or check conditions for combined printing (N-up printing) (combined printing region 4A7); and so on.

When the conditions designating screen 4A is displayed in the touch-sensitive panel display 10g, the user taps on a button in the conditions designating screen 4A, and so on. This enables the user to specify the conditions for the copy job. The user also may specify the conditions for the copy job by writing a predetermined letter or figure with a finger 6 in the touch-sensitive panel display 10g. The below description focuses on, in particular, processing for the case where the user writes a predetermined letter or figure.

Referring back to FIG. 3, the gesture determination portion 102 determines what kind of gesture the user has made on the touch-sensitive panel display 10g or the like by using a conventional method.

For example, as shown in FIG. 5, when the user writes figures "1" and "0 (zero)" in order, the gesture determination portion 102 determines that the user has made a gesture of writing the figure "10" by hand. Alternatively, as shown in FIG. 6, when the user writes a letter "C", the gesture determination portion 102 determines that the user has made a gesture of writing the figure "C" by hand. Referring to FIGS. 5 and 6, trails 400, 401, and 402 are made by the user who slides his/her finger 6 on the touch-sensitive panel display 10g.

The conditions determination portion 103 determines, based on predetermined rules, conditions corresponding to the handwriting gesture determined by the gesture determination portion 102, namely, the conditions designated by the user (hereinafter, referred to as "specified conditions"). In this embodiment, it is determined in advance that the gesture of writing a figure by hand is a gesture to specify the number of prints. It is also determined in advance that the gesture of writing the letter "C" is a gesture to specify the manual paper feed tray as the supply source from which paper sheets are supplied.

Thus, if the handwriting gesture determined by the gesture determination portion 102 is the gesture of writing the figure "10" by hand, then the conditions determination portion 103 determines that the specified conditions is to set the number of prints at 10 sets. Alternatively, if the handwriting gesture determined by the gesture determination portion 102 is the gesture of writing the letter "C" by hand, then the conditions determination portion 103 determines that the specified conditions is to use the manual paper feed tray as the supply source from which paper sheets are supplied.

Every time determining specified conditions, the conditions determination portion 103 issues a unique identification code, generates specified conditions data 5A indicating the identification code and the specified conditions (item name and the content of conditions), and stores the specified conditions data 5A into the conditions storage portion 104. In the case of the first example, as the specified conditions data 5A, the conditions determination portion 103 generates data indicating "001, the number of prints, 10 sets" to store the data into the conditions storage portion 104. In the case of the second example, as the specified conditions data 5A, the conditions determination portion 103 generates data indicating "002, supply source, manual paper feed tray" to store the data into the conditions storage portion 104.

Every time the conditions determination portion 103 determines specified conditions, the conditions designating screen display portion 101 updates the conditions designating screen 4A so that the specified conditions determined are reflected.

For example, if the specified conditions determined are to set the number of prints at "10" sets, then the conditions designating screen display portion 101 updates the conditions designating screen 4A so that "10" is indicated in the print number region 4A1 as shown in FIG. 7.

Thereafter, if new specified conditions are determined and the new specified conditions are to use the manual paper feed tray as the supply source of paper, then the conditions designating screen display portion 101 updates the conditions designating screen 4A so that only the select button 4A25 of the select buttons 4A21-4A26 is selected as shown in FIG. 8.

Hereinafter, in the conditions designating screen 4A, a part in which the specified conditions are reflected is referred to as an "updated part 4B". In the foregoing first example, the updated part 4B is the print number region 4A1. In the second example, the updated part 4B is the select button 4A25.

At a time when the user finishes the handwriting gesture in the conditions designating screen 4A, the hidden region presuming portion 105 presumes a region which is covered by a hand of the user to prevent him/her from seeing, for example, in the following manner. Hereinafter, such a region is referred to as a "hidden region 4C".

As shown in FIG. 9(A), image data 5B on a hand image 4D is prepared in advance. As seen from FIG. 9(A), the hand image 4D has such a shape that at least one finger contacting the touch-sensitive panel display 10g (index finger, for example) is straighten. The size of the hand image 4D is a size of a hand of a person having standard proportions. As the hand image 4D, a polygon (triangle, quadrangle, rectangle, or pentagon) approximate to the image of the hand of the person having standard proportions may be used.

As shown in FIG. 9(B), the hidden region presuming portion 105 places the hand image 4D in the conditions designating screen 4A in such a manner that a fingertip 4D1 of the index finger is positioned on coordinates at which the index finger contacted at the end of the handwriting gesture. The hidden region presuming portion 105 then presumes that a region where the hand image 4D is overlaid in the conditions designating screen 4A, i.e., a region enclosed by a thick line, is the hidden region 4C.

The overlap presence/absence determination portion 106 determines, for each of the specified conditions, whether or not the updated part 4B corresponding to the specified conditions is overlaid on the hidden region 4C. The overlap presence/absence determination portion 106 then generates, for each of the specified conditions, a flag 5C which indicates the determination result, correlates the flag 5C to an identification code of the specified conditions, and stores the resultant into the flag storage portion 107. The flag 5C having a value of "1" indicates that the updated part 4B is overlaid on the hidden region 4C. The flag 5C having a value of "0 (zero)" indicates that the updated part 4B is not overlaid on the hidden region 4C. The identification code is, for example, an identification code issued by the conditions determination portion 103.

Where the hidden region 4C and at least a part of the updated part 4B overlap each other, the overlap presence/absence determination portion 106 determines that the hidden region 4C and the updated part 4B overlap each other. Instead of this, the overlap presence/absence determination portion 106 may determine that that the hidden region 4C and the updated part 4B overlap each other where the hidden region 4C and the entirety of the updated part 4B overlap each other.

Through the foregoing processing from the conditions designating screen display portion 101 to the overlap presence/absence determination portion 106, every time the user performs a handwriting gesture, the specified conditions data 5A is generated and stored into the conditions storage portion 104, and the flag 5C is generated and stored into the flag storage portion 107.

After finishing specifying the conditions for the copy job, the user performs predetermined operation to give a command to execute the copy job to the image forming apparatus 1. For example, as the predetermined operation, the user presses the start key of the operating key panel 10h.

Figure 10:
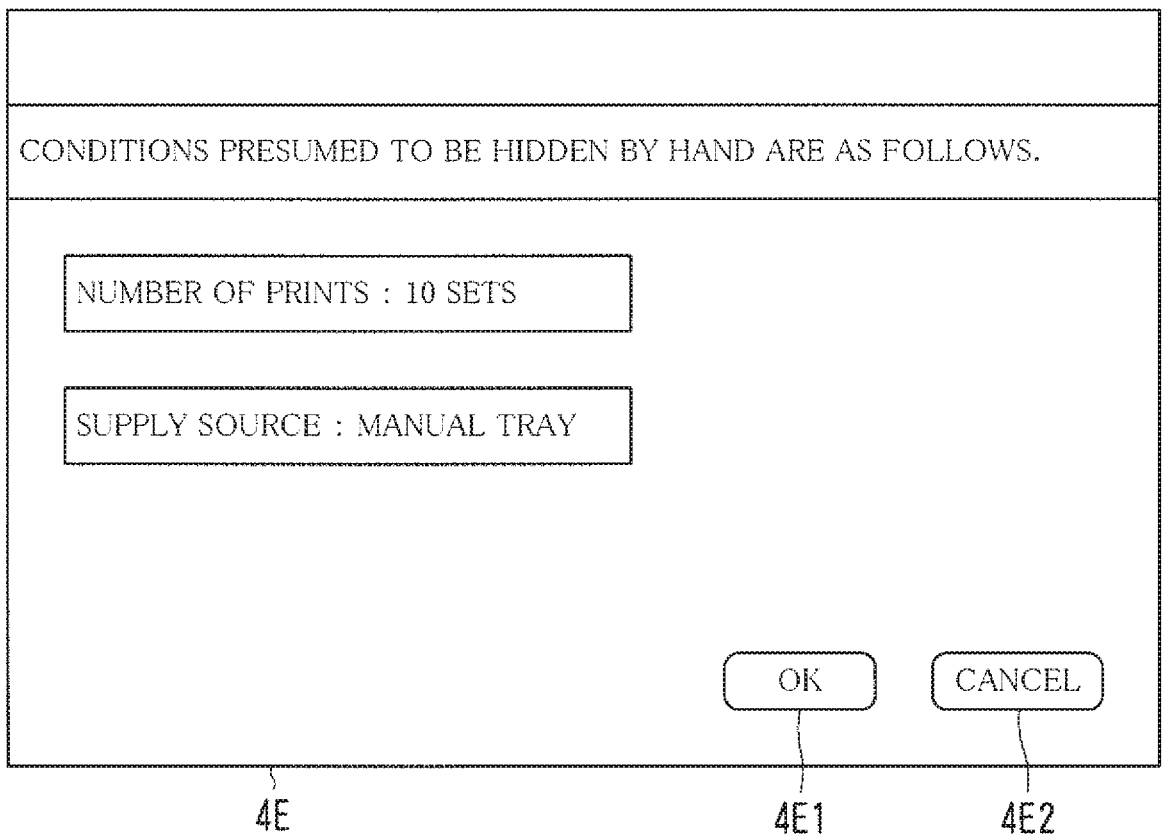
FIG. 10 is a diagram showing an example of a conditions check screen.

In response to the user operation, the check screen display portion 108 displays the conditions check screen 4E as shown in FIG. 10 instead of the conditions designating screen 4A. The conditions check screen 4E shows the specified conditions (item name and content) corresponding to the flag 5C having a value of "1". Stated differently, the conditions check screen 4E shows the specified conditions corresponding to an overlap of the updated part 4B and the hidden region 4C.

The item name and content of the specified conditions are the same as those indicated in the specified conditions data 5A stored in the conditions storage portion 104. To be specific, where a certain flag 5C has a value of "1" and the flag 5C is correlated to "001", the check screen display portion 108 reads out, from the conditions storage portion 104, the specified conditions data 5A of which the identification code is "001". The check screen display portion 108 then generates the conditions check screen 4E in such a manner that the item name and content shown in the specified conditions data 5A are indicated, and displays the conditions check screen 4E.

The user sees the conditions check screen 4E to check the specified conditions. In order to execute the copy job in accordance with the specified conditions, the user taps on an OK button 4E1. In order to specify the conditions again, the user taps on a cancel button 4E2.

In response to the OK button 4E1 tapped on, the job execution portion 109 reads out the specified conditions data 5A from the conditions storage portion 104, and controls, for example, the scanner unit 10k and the printing unit 10m so that the copy job is executed in accordance with the specified conditions indicated in the specified conditions data 5A. As to items for which the user has specified no conditions, the copy job is executed in accordance with the default conditions.

Upon the start of the copy job, the specified conditions data 5A is deleted from the conditions storage portion 104 and the flag 5C is deleted from the flag storage portion 107. Further, the conditions designating screen display portion 101 displays, instead of the conditions check screen 4E, the conditions designating screen 4A having the default settings.

Where the cancel button 4E2 is tapped on, the conditions designating screen display portion 101 displays, instead of the conditions check screen 4E, the conditions designating screen 4A having the last state, namely, having the specified conditions reflected.

Figure 11:
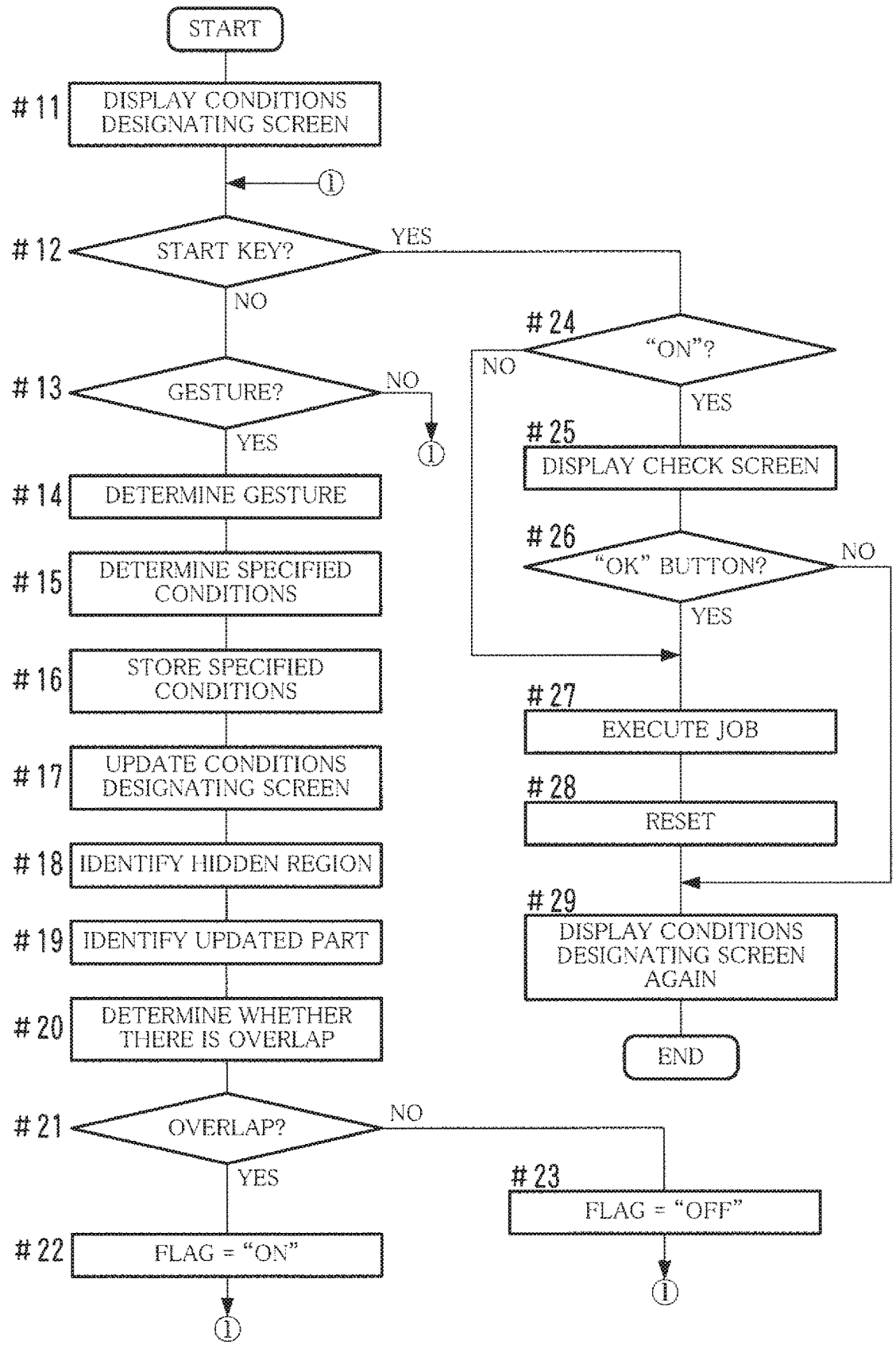
FIG. 11 is a flowchart depicting an example of the flow of the entire processing for the case where a copy job is executed.

FIG. 11 is a flowchart depicting an example of the flow of the entire processing for the case where a copy job is executed.

The description goes on to the flow of the entire processing by the image forming apparatus 1 for the case where the user specifies conditions through a handwriting gesture. The description is provided with reference to the flowchart.

The image forming apparatus 1 performs the processing based on the copy job program 100 in the steps as depicted in FIG. 11.

After the copy job program 100 is started, or, alternatively, after a predetermined command is entered, the image forming apparatus 1 displays the conditions designating screen 4A (Step #11 of FIG. 11).

Before the start key is pressed (NO in Step #12), the image forming apparatus 1 performs the processing of Steps #14-#23 appropriately in response to a gesture on the touch-sensitive panel display 10g made by the user. The processing is performed as follows.

When the user performs a gesture (YES in Step #13), the image forming apparatus 1 determines what kind of the gesture the user has made (Step #14). In particular, where the gesture is a handwriting gesture, the image forming apparatus 1 also determines a figure or letter represented by the gesture.

The image forming apparatus 1 determines, based on the result of determination in Step #14 and predetermined rules, conditions specified through the gesture (Step #15). The image forming apparatus 1 then issues an identification code, and stores the identification code together with the determined conditions (specified conditions) as the specified conditions data 5A (Step #16).

In parallel with the processing of Step #16 or before or after the same, the image forming apparatus 1 updates the conditions designating screen 4A so that the specified conditions thus determined are reflected (Step #17).

The image forming apparatus 1 further identifies, in the conditions designating screen 4A, a region blocked from user's view due to the presence of his/her hand (hidden region 4C) and a part in which the specified conditions are reflected (updated part 4B) (Steps #18 and #19). The image forming apparatus 1 then determines whether or not the hidden region 4C overlaps the updated part 4B (Step #20).

Where the hidden region 4C overlaps the updated part 4B (YES in Step #21), the image forming apparatus 1 generates a flag 5C having a value of "1", correlates the flag 5C to the identification code issued in Step #16, and stores the resultant (Step #22). Otherwise (NO in Step #21), the image forming apparatus 1 generates a flag 5C having a value of "0 (zero)", correlates the flag 5C to the identification code issued in Step #16, and stores the resultant (Step #23).

In response to the start key pressed by the user (Yes in Step #12), the image forming apparatus 1 displays the conditions check screen 4E (Step #25) in place of the conditions designating screen 4A as long as the image forming apparatus 1 stores at least one flag 5C having a value of "1" (YES in Step #24). The conditions check screen 4E shows specified conditions of the specified conditions data 5A corresponding to each of the flags 5C having a value of "1".

When the user taps on the OK button 4E1 (YES in Step #26), the image forming apparatus 1 executes the copy job (Step #27) in accordance with the specified conditions indicated in the specified conditions data 5A stored in Step #16.

The image forming apparatus 1 deletes all of the specified conditions data 5A and the flags 5C (Step #28), and displays again the conditions designating screen 4A indicating the default conditions in place of the conditions check screen 4E (Step #29).

Where storing no flag 5C having a value of "1" (NO in Step #24), the image forming apparatus 1 does not display the conditions check screen 4E and executes the copy job (Step #27) in accordance with the specified conditions indicated in the specified conditions data 5A stored in Step #16 and so on.

The image forming apparatus 1 then deletes all of the specified conditions data 5A and the flag 5C (Step #28), and displays again the conditions designating screen 4A indicating the default conditions (Step #29).

Where the user taps on the cancel button 4E2 (NO in Step #26), the image forming apparatus 1 displays, in place of the conditions check screen 4E, the conditions designating screen 4A having a state immediately before the execution of Step #25 (Step #29). To be specific, the image forming apparatus 1 displays the conditions designating screen 4A in a state where the specified conditions are reflected.

Second Embodiment

Figure 12:
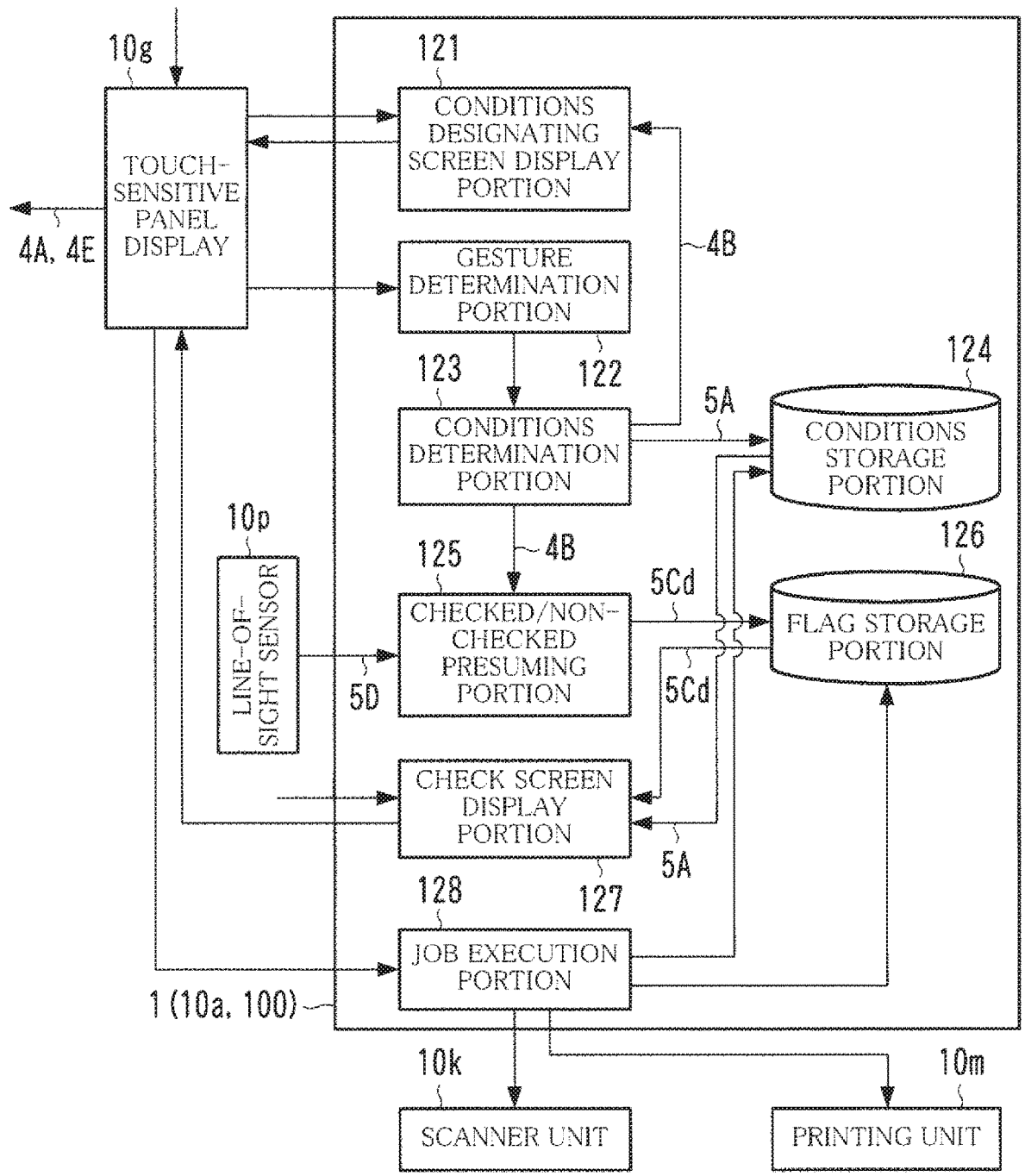
FIG. 12 is a diagram showing a second example of the overall configuration of an image forming apparatus.
Figure 13A:
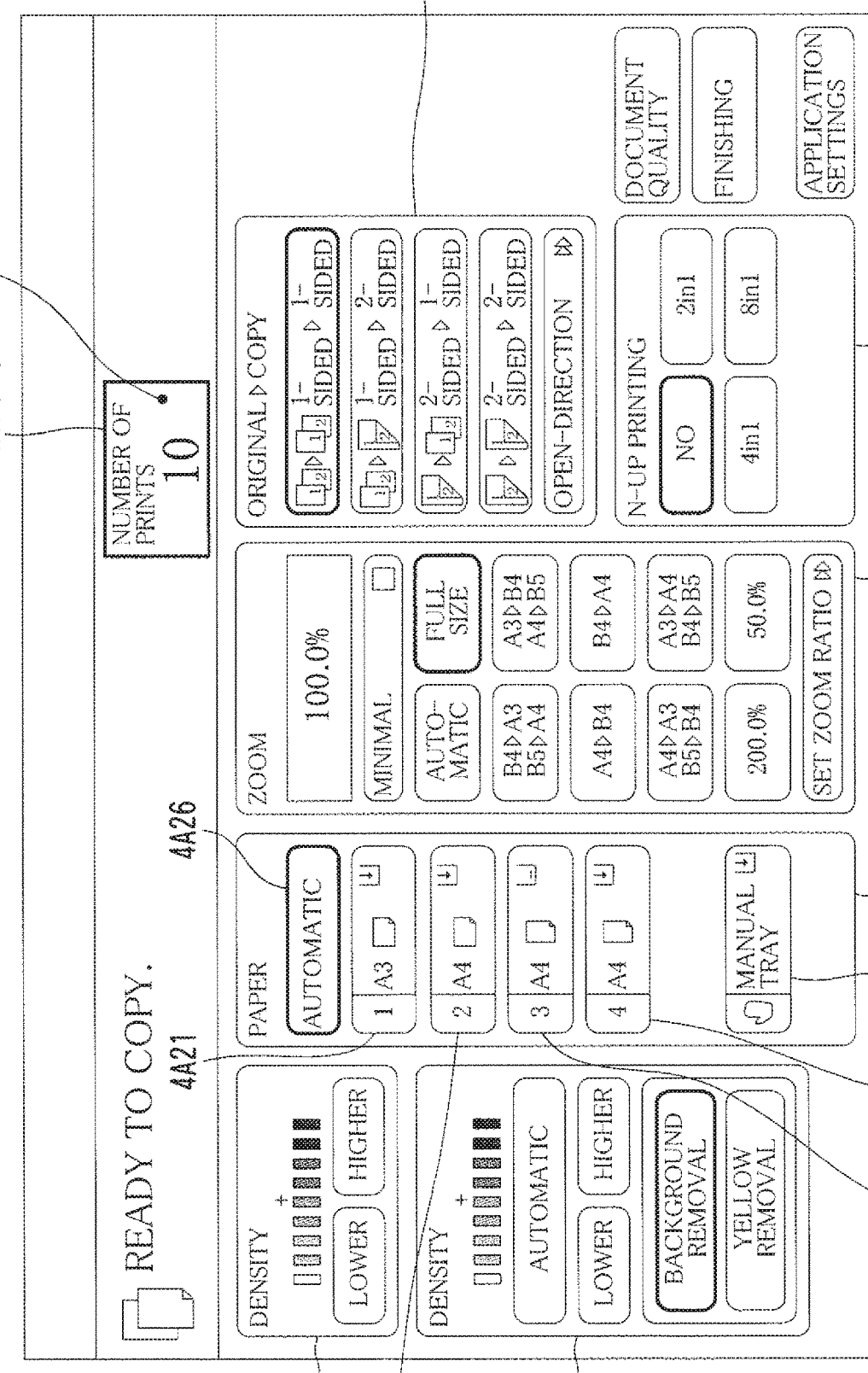
FIGS. 13A and 13B are diagrams showing an example of the positional relationship between a target position and an updated part.
Figure 13B:
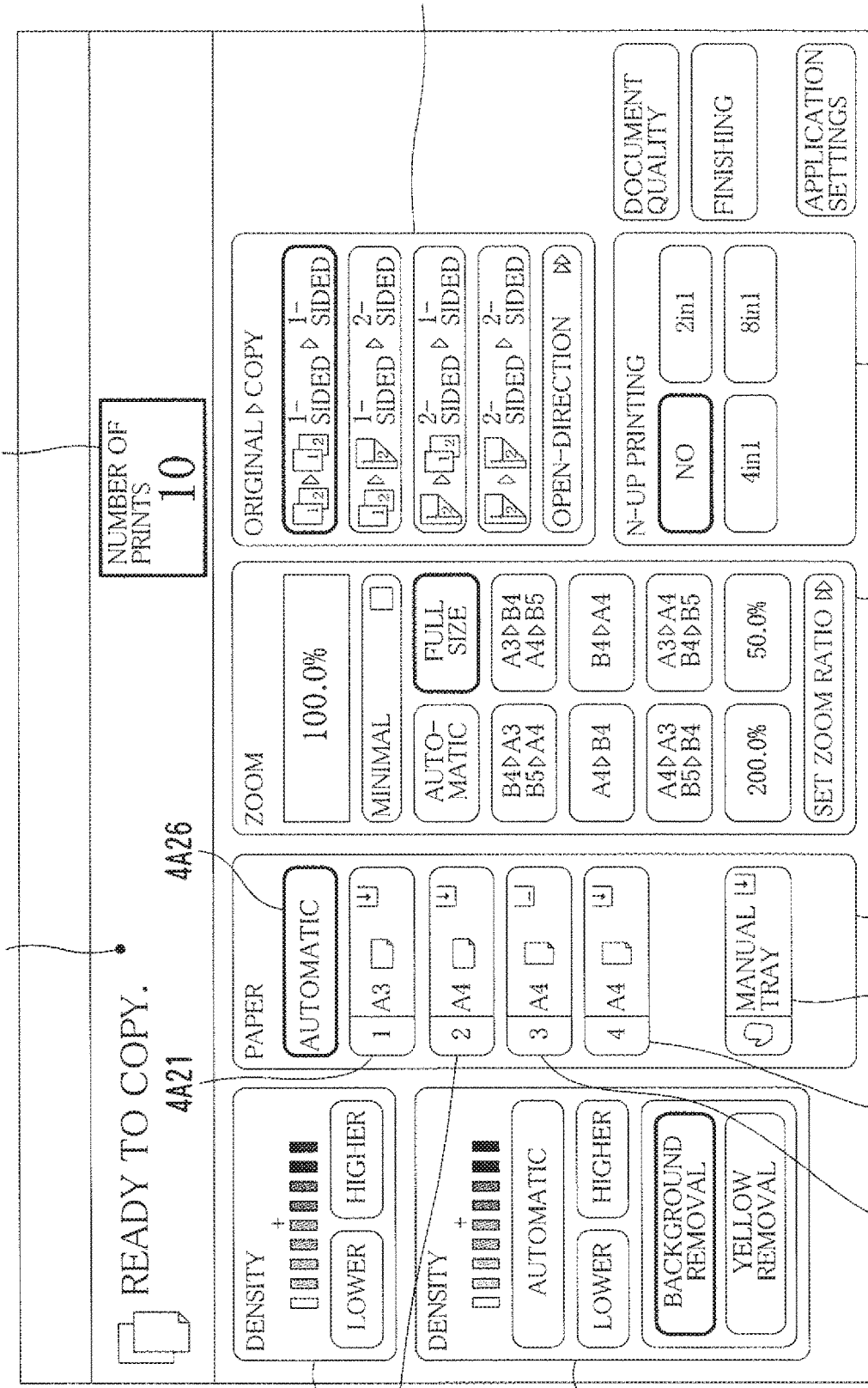

FIG. 12 is a diagram showing a second example of the overall configuration of the image forming apparatus 1. FIGS. 13A and 13B are diagrams showing an example of the positional relationship between a target position 4F and the updated part 4B.

In the first embodiment, the image forming apparatus 1 presumes whether or not the user has checked the updated part 4B based on the positional relationship between the updated part 4B and the hidden region 4C. In the second embodiment, the presumption is performed by means of the line-of-sight sensor 10p.

In the second embodiment, the hardware configuration of the image forming apparatus 1 is similar to that in the first embodiment, and is shown in FIG. 2. However, the NV-RAM 10d, the ROM 10e, or the NV-RAM 10d stores therein a copy job program 100' instead of the copy job program 100.

The copy job program 100' implements, in the image forming apparatus 1, the functions of a conditions designating screen display portion 121, a gesture determination portion 122, a conditions determination portion 123, a conditions storage portion 124, a checked/non-checked presuming portion 125, a flag storage portion 126, a check screen display portion 127, a job execution portion 128, and so on, all of which are shown in FIG. 12.

The description goes on to the processing by the individual portions of the conditions designating screen display portion 121 through the job execution portion 128. Descriptions of parts that are identical with those in the first embodiment are omitted.

The conditions designating screen display portion 121, the gesture determination portion 122, the conditions determination portion 123, and the conditions storage portion 124 perform the same processing as that by the conditions designating screen display portion 101, the gesture determination portion 102, the conditions determination portion 103, and the conditions storage portion 104 (see FIG. 3) of the first embodiment, respectively.

The checked/non-checked presuming portion 125 presumes the presence or absence of a check on the specified conditions by the user at a time when the user finishes performing a gesture. The presumption is made in the following manner.

The checked/non-checked presuming portion 125 obtains line-of-sight data 5D from the line-of-sight sensor 10p. The line-of-sight data 5D shows a line-of-sight detected by the line-of-sight sensor 10p at the time when the user finishes the gesture. The checked/non-checked presuming portion 125 uses a conventional method to identify, based on the line-of-sight data 5D, which position of the conditions designating screen 4A the user looks at.

Hereinafter, a position at which the user looks is referred to as the "target position 4F", and coordinates thereof are referred to as (Ax, Ay). The updated part 4B has a rectangular shape. The coordinates of the upper left and the lower right of the updated part 4B are referred to as (Bx1, By1) and (Bx2, By2), respectively.

Where the target position 4F is located in the updated part 4B as shown in FIG. 13A, namely, where both the inequalities (1) and (2) provided below are satisfied, the checked/non-checked presuming portion 125 presumes that the user has checked the specified conditions.

$$Bx1 \leq Ax \leq Bx2 \quad (1)$$

$$By1 \leq Ay \leq By2 \quad (2)$$

In contrast, where the target position 4F is not located in the updated part 4B as shown in FIG. 13B, namely, where at least one of the inequalities (1) and (2) is not satisfied, the checked/non-checked presuming portion 125 presumes that the user has not yet checked the specified conditions.

The checked/non-checked presuming portion 125 then generates a flag 5Cd which indicates the presumption result, correlates the flag 5Cd to an identification code of the specified conditions, and stores the resultant into the flag storage portion 126. The flag 5Cd having a value of "0 (zero)" indicates that the user has checked the specified conditions. The flag 5Cd having a value of "1" indicates that the user has not checked the specified conditions. The identification code is, for example, an identification code issued by the conditions determination portion 123.

Through the foregoing processing from the conditions designating screen display portion 121 through the checked/non-checked presuming portion 125, every time the user performs a handwriting gesture, the specified conditions data 5A is generated and stored into the conditions storage portion 124, and the flag 5Cd is generated and stored into the flag storage portion 126.

As with the first embodiment, after finishing specifying the conditions for the copy job, the user performs predetermined operation to give a command to execute the copy job to the image forming apparatus 1.

In response to the user operation, the check screen display portion 127 displays the conditions check screen 4E as shown in FIG. 10 instead of the conditions designating screen 4A as shown in FIG. 4, as with the check screen display portion 108. It is noted, however, that the flag 5Cd rather than the flag 5C is used. Thus, the conditions check screen 4E shows specified conditions which are presumed not to be confirmed. The processing after the conditions check screen 4E is displayed is the same as that of the first embodiment.

Figure 14:
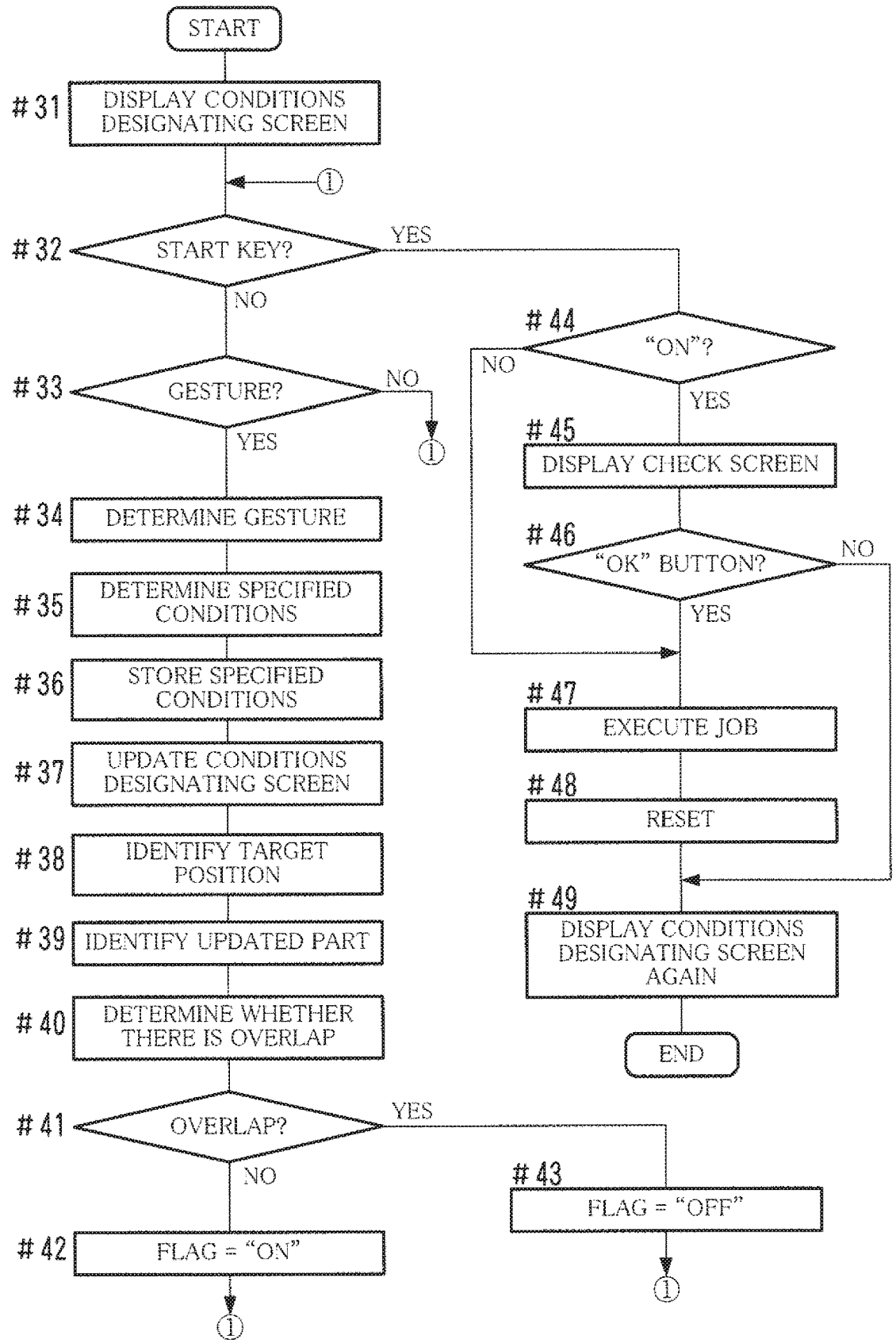
FIG. 14 is a flowchart depicting a second example of the flow of the entire processing for the case where a copy job is executed.

FIG. 14 is a flowchart depicting a second example of the flow of the entire processing for the case where a copy job is executed.

The description goes on to the flow of the entire processing by the image forming apparatus 1 in the second embodiment. The description is provided with reference to the flowchart.

The image forming apparatus 1 performs the processing based on the copy job program 100' in the steps as depicted in FIG. 14.

As with the case of the first embodiment, after the copy job program 100 is started, or, alternatively, after a predetermined command is entered, the image forming apparatus 1 displays the conditions designating screen 4A (Step #31 of FIG. 14).

The subsequent processing is basically the same as that of Steps #12-#29 of the first embodiment (Steps #32-#49).

It is noted, however, that the image forming apparatus 1 presumes the target position 4F in Step #38 instead of determining the hidden region 4C. The image forming apparatus 1 determines, in Step #40, whether or not the target position 4F is located in (overlaps) the updated part 4B. If the target position 4F is located in the updated part 4B (YES in Step #41), then the image forming apparatus 1 generates a flag 5Cd having a value of "0 (zero)" (Step #43). Otherwise (NO in Step #41), the image forming apparatus 1 generates a flag 5Cd having a value of "1" (Step #42). In Step #45, the image forming apparatus 1 uses the flag 5Cd rather than the flag 5C.

According to the first embodiment and the second embodiment, it is possible to prompt the user to check conditions for a copy job specified by him/her in the touch-sensitive panel display 10g more efficiently than is conventionally possible.

Modification

In the first embodiment, the image forming apparatus 1 sets the flag 5C corresponding to the specified conditions at "1" for the case where the updated part 4B overlaps the hidden region 4C. After that, the image forming apparatus 1 of the first embodiment does not update the value of the flag 5C. Instead of this, however, the value of the flag 5C may be changed from "1" to "0 (zero)", for example, in the following manner.

The image forming apparatus 1 is configured to provide a flag update portion. The copy job program 100 implements the function of the flag update portion.

While the user performs a gesture, the proximity sensor 10q keeps detecting an object, specifically, the finger 6. In some cases, the specified conditions corresponding to the gesture are determined, the flag 5C for the specified conditions is generated and stored into the conditions storage portion 104, and the user gets his/her hand off of the touch-sensitive panel display 10g before he/she performs the next gesture. Moving the hand away from the touch-sensitive panel display 10g does not enable the proximity sensor 10q to detect the object. At this time, nothing hides the touch-sensitive panel display 10g, which allows the user to see the updated part 4B and to check the specified conditions.

In view of this, where specified conditions corresponding to a gesture are determined, a flag 5C for the specified conditions is generated and stored into the conditions storage portion 104, and then, the proximity sensor 10q detects no more object, the flag update portion updates the value of the flag 5C with "0 (zero)". The flag update portion does not update the value of the flag 5C where the proximity sensor 10q keeps detecting the object.

Alternatively, the flag update portion may update the value of the flag 5C with "0 (zero)" when a predetermined amount of time (2-5 seconds, for example) has elapsed since the proximity sensor 10q detected no more objects.

Yet alternatively, independently of whether or not the proximity sensor 10q detects an object, the flag update portion may update the value of the flag 5C with "0 (zero)" when an interval between the determination of the gesture and start of the next gesture is equal to or longer than a predetermined amount of time (2-5 seconds, for example). The flag update portion does not update the value of the flag 5C where the interval is shorter than the predetermined amount of time.

In the second embodiment, the checked/non-checked presuming portion 125 determines whether or not the user has checked the specified conditions at the end of the gesture. Instead of this, the checked/non-checked presuming portion 125 may determine whether or not the user has checked the specified conditions before a predetermined period of time has elapsed since the user has finished the gesture (alternatively, since the hand image 4D moved out from the updated part 4B after the gesture is finished). In such a case, the checked/non-checked presuming portion 125 keeps obtaining the line-of-sight data 5D from the line-of-sight sensor 10p within the predetermined period of time and keeps checking whether or not the inequalities (1) ad (2) are satisfied. The checked/non-checked presuming portion 125 may presume that the user has checked the specified conditions when both the inequalities are satisfied at least once. The checked/non-checked presuming portion 125 may presume that the user has not checked the specified conditions when none of the inequalities are satisfied even once.

In order to prevent the flag 5Cd from being set at "0 (zero)" when the line of sight of user's eyes incidentally moves toward the specified conditions, the checked/non-checked presuming portion 125 may be configured to presume that the user has checked the specified conditions when both the two inequalities are satisfied successively for a predetermined amount of time (1-2 seconds, for example) within the predetermined period of time. Otherwise, the checked/non-checked presuming portion 125 may be configured to presume that the user has not checked the specified conditions.

In the second embodiment, the checked/non-checked presuming portion 125 presumes whether or not the user has checked the updated part 4B based on the line-of-sight data 5D obtained by the line-of-sight sensor 10p. The checked/non-checked presuming portion 125 may make further presumption in light of the positional relationship between the updated part 4B and the hidden region 4C in the following manner.

The checked/non-checked presuming portion 125 uses the foregoing method to locate the target position 4F based on the line-of-sight data 5D. The checked/non-checked presuming portion 125 then determines whether or not the target position 4F is located in the updated part 4B. Further, the checked/non-checked presuming portion 125 uses the method described in the first embodiment to determine whether or not the updated part 4B overlaps the hidden region 4C.

Where the target position 4F is located in the updated part 4B, and further, where the updated part 4B does not overlap the hidden region 4C, the checked/non-checked presuming portion 125 determines that the user has checked the updated part 4B. In contrast, where the target position 4F is not located in the updated part 4B, and further, where the updated part 4B overlaps the hidden region 4C, the checked/non-checked presuming portion 125 determines that the user has not checked the updated part 4B.

The first embodiment and the second embodiment take the example where the user specifies conditions for a copy job. However, the present invention is also applicable to the case where the user specifies conditions for other jobs. The other jobs are, for example, a job of sending an image via facsimile, a job of sending an image saved to a box, and a job of printing an image saved to a box.

In the first embodiment and the second embodiment, the case is described in which specified conditions through a handwriting gesture are received. The present invention is also applicable to the case where specified conditions through tap, double-tap, or flick are received.

For example, suppose that tapping on a button increases the number of prints one by one, a region showing the number of prints is provided below the button, and therefore, the region is invisible behind the user's hand. In such a case, the image forming apparatus 1 preferably shows the number of prints in the conditions check screen 4E.

In the first embodiment, the hand image 4D is an image of a hand of a person having standard proportions or an image of a polygon approximate thereto. Instead of this, however, images having different sizes may be prepared so that the images are used selectively depending on the size of a user's hand. Further, images of a right hand and a left hand may be prepared so that the images are used selectively depending on whether the user is right-handed or left-handed.

Where the user performs a gesture by using an object such as a stylus, an image is preferably used, as the hand image 4D, which shows the object and the state where the user holds the object.

In the first embodiment and the second embodiment, the conditions check screen 4E shows only specified conditions corresponding to the flag 5C or 5Cd having a value of "1". The conditions check screen 4E may be so configured as to also show specified conditions corresponding to the flag 5C or 5Cd having a value of "0 (zero)". In such a case, however, the specified conditions corresponding to the flag 5C or 5Cd having a value of "1" is so set as to take precedence over the specified conditions corresponding to the flag 5C or 5Cd having a value of "0". For example, the font size for the specified conditions corresponding to the flag 5C or 5Cd having a value of "1" is set to be larger than the font size for the specified conditions corresponding to the flag 5C or 5Cd having a value of "0". Alternatively, the specified conditions corresponding to the flag 5C or 5Cd having a value of "1" are placed upward, and the specified conditions corresponding to the flag 5C or 5Cd having a value of "0" are placed downward.

In the first embodiment and the second embodiment, where some specified conditions are not applicable at the same time, the specified conditions (conditions conflicting with each other) may be shown in the conditions check screen 4E unconditionally. Alternatively, the specified conditions (conditions conflicting with each other) may be shown in a screen different from the conditions check screen 4E to be presented to the user.

It is to be understood that the overall configuration of the image forming apparatus 1, the constituent elements thereof, the content of the processing, the order of the processing, the structure of the screen, and the like may be appropriately modified without departing from the spirit of the present invention.

Although embodiments of the present invention have been described and illustrated in detail, the disclosed embodiments are made for purposes of illustration and example only and not limitation. The scope of the present invention should be interpreted by terms of the appended claims.

What is claimed is:

1. An image processing apparatus comprising:
a touch-sensitive panel display; and
a hardware processor,
wherein the hardware processor is configured to:
identify a range of a hidden region after a user finishes performing a handwriting gesture on the touch-sensitive panel display, the handwriting gesture being a gesture in which the user performs an action of handwriting a character on the touch-sensitive panel display, and the hidden region being a part of the touch-sensitive panel display that is covered at least by a hand of the user to prevent the user from seeing the part of the touch-sensitive panel display, and
determine a condition corresponding to the handwriting gesture, from among a plurality of conditions which are displayed on the touch-sensitive panel display and which relate to settings of the image processing apparatus,
wherein, when a requirement that the range of the hidden region and a display region of the touch-sensitive panel display in which the condition is displayed overlap each other is satisfied, the touch-sensitive panel display displays the condition again before processing is performed in accordance with the condition, and
wherein a format in which the condition is displayed when the handwriting gesture is being performed differs from a format in which the condition is displayed again before the processing is performed in accordance with the condition.

2. The image processing apparatus according to claim 1, wherein, when the requirement is satisfied, the touch-sensitive panel display again displays the condition in response to a next gesture by the user before a lapse of a predetermined amount of time after the handwriting gesture by the user.

3. The image processing apparatus according to claim 1, wherein:
the touch-sensitive panel display receives, as the handwriting gesture, a handwriting gesture performed by the user by bringing a finger of the user or an object into contact with the touch-sensitive panel display, and
when the requirement is satisfied, the hardware processor displays again the condition when the user performs a next gesture, after the handwriting gesture, while retaining the finger or the object within a predetermined distance from the touch-sensitive panel display.

4. The image processing apparatus according to claim 1, wherein:
the hardware processor identifies the range of the hidden region every time the user finishes performing the handwriting gesture, and determines the condition corresponding to the handwriting gesture, and
the touch-sensitive panel display collectively displays again each condition with respect to which the requirement is satisfied from among the plurality of conditions.

5. The image processing apparatus according to claim 4, wherein, when two or more conditions of the plurality of conditions conflict with one another, the touch-sensitive panel display again displays the two or more conditions.

6. The image processing apparatus according to claim 1, wherein:
the hardware processor identifies the range of the hidden region every time the user finishes performing the handwriting gesture, and determines the condition corresponding to the handwriting gesture, and
the touch-sensitive panel collectively displays again each condition with respect to which the requirement is satisfied from among the plurality of conditions, in such a way that one of the conditions collectively displayed again takes precedence over others of the conditions collectively displayed again.

7. The image processing apparatus according to claim 1, wherein:
the hardware processor identifies a target position in the touch-sensitive panel display, the target position being a position at which the user looks after finishing performing the handwriting gesture, and
after the requirement is satisfied, the touch-sensitive panel display displays the condition again when an amount of time between (i) a time at which the display region and the range of the hidden region no longer overlap each other and (ii) a time at which the target position overlaps the display region is longer than a predetermined amount of time.

8. The image processing apparatus according to claim 1, wherein:
the hardware processor identifies a target position every time the user finishes performing the handwriting gesture, the target position being a position at which the user looks in the touch-sensitive panel display, identifies the range of the hidden region, and determines the condition corresponding to the handwriting gesture, and
the touch-sensitive panel display collectively displays again each condition with respect to which, after the requirement is satisfied, an amount of time between (i) a time at which the display region and the range of the hidden region no longer overlap each other and (ii) a time at which the target position overlaps the display region is longer than a predetermined amount of time.

9. The image processing apparatus according to claim 1, wherein:
the hardware processor identifies a target position every time the user finishes performing the handwriting gesture, the target position being a position at which the user looks in the touch-sensitive panel display, identifies the range of the hidden region, and determines the condition corresponding to the handwriting gesture, and
the touch-sensitive panel display collectively displays again each condition with respect to which, after the requirement is satisfied, an amount of time between (i) a time at which the display region and the range of the hidden region no longer overlap each other and (ii) a time at which the target position overlaps the display region is longer than a predetermined amount of time, in such a way that one of the conditions collectively displayed again takes precedence over others of the conditions collectively displayed again.

10. The image processing apparatus according to claim 1, wherein the condition is displayed as a part of a first screen on which the handwriting gesture is performed, and the condition is displayed again as a part of a second screen, which is different from the first screen and which is displayed instead of the first screen, before the processing is performed in accordance with the condition.

11. The image processing apparatus according to claim 10, wherein the second screen includes a first input operation area configured to receive an instruction to perform the processing in accordance with the condition, and a second input operation area configured to receive an instruction to return to the first screen.

12. The image processing apparatus according to claim 1, wherein the condition is displayed again after the requirement is satisfied in response to an instruction to perform the processing in accordance with the condition, before the processing is performed in accordance with the condition.

13. The image processing apparatus according to claim 1, wherein the hardware processor identifies the range of the hidden region based on a position on the touch-sensitive panel display at which the handwriting gesture is performed and stored image data indicating a shape of a hand of a person.

14. A method for displaying conditions in an image processing apparatus including a touch-sensitive panel display, the method comprising:
   causing the image processing apparatus to identify a range of a hidden region after a user finishes performing a handwriting gesture on the touch-sensitive panel display, the handwriting gesture being a gesture in which the user performs an action of handwriting a character on the touch-sensitive panel display, and the hidden region being a part of the touch-sensitive panel display that is covered at least by a hand of the user to prevent the user from seeing the part of the touch-sensitive panel display;
   causing the image processing apparatus to determine a condition corresponding to the handwriting gesture, from among a plurality of conditions which are displayed on the touch-sensitive panel display and which relate to settings of the image processing apparatus; and
   when a requirement that the range of the hidden region and a display region of the touch-sensitive panel display in which the condition is displayed overlap each other is satisfied, causing the image processing apparatus to display, on the touch-sensitive panel display, the condition again before processing is performed in accordance with the condition,
   wherein a format in which the condition is displayed when the handwriting gesture is performed differs from a format in which the condition is displayed again before the processing is performed in accordance with the condition.

15. A non-transitory recording medium storing a computer readable program used in an image processing apparatus including a touch-sensitive panel display, the computer readable program causing the image processing apparatus to perform processing comprising:
   processing for identifying a range of a hidden region after a user finishes performing a handwriting gesture on the touch-sensitive panel display, the handwriting gesture being a gesture in which the user performs an action of handwriting a character on the touch-sensitive panel display, and the hidden region being a part of the touch-sensitive panel display that is covered at least by a hand of the user to prevent the user from seeing the part of the touch-sensitive panel display;
   processing for determining a condition corresponding to the handwriting gesture, from among a plurality of conditions which are displayed on the touch-sensitive panel display and which relate to settings of the image processing apparatus; and
   when a requirement that the range of the hidden region and a display region of the touch-sensitive panel display in which the condition is displayed overlap each other is satisfied, processing for displaying, on the touch-sensitive panel display, the condition again before processing is performed in accordance with the condition,
   wherein a format in which the condition is displayed when the handwriting gesture is performed differs from a format in which the condition is displayed again before the processing is performed in accordance with the condition.

\* \* \* \* \*